Nov. 28, 1967 R. J. KOERNER 3,355,707
APPARATUS FOR VEHICLE DETECTION
Filed May 11, 1964 4 Sheets-Sheet 1

INVENTOR
RALPH J. KOERNER
BY
ATTORNEY

Nov. 28, 1967  R. J. KOERNER  3,355,707
APPARATUS FOR VEHICLE DETECTION
Filed May 11, 1964  4 Sheets-Sheet 2

INVENTOR
RALPH J. KOERNER
BY
ATTORNEY

Nov. 28, 1967   R. J. KOERNER   3,355,707
APPARATUS FOR VEHICLE DETECTION
Filed May 11, 1964   4 Sheets-Sheet 3

INVENTOR
RALPH J. KOERNER
BY
*A. Wasserman*
ATTORNEY

Nov. 28, 1967  R. J. KOERNER  3,355,707
APPARATUS FOR VEHICLE DETECTION
Filed May 11, 1964  4 Sheets-Sheet 4

INVENTOR
RALPH J. KOERNER
BY
ATTORNEY

United States Patent Office 3,355,707
Patented Nov. 28, 1967

3,355,707
APPARATUS FOR VEHICLE DETECTION
Ralph J. Koerner, Los Angeles, Calif., assignor, by mesne assignments, to The Bunker-Ramo Corporation, Stamford, Conn., a corporation of Delaware
Filed May 11, 1964, Ser. No. 366,425
6 Claims. (Cl. 340—38)

The present invention relates to an improved apparatus for detecting or sensing the presence of stationary or moving vehicles on or along a path or roadway circumscribing a portion of the earth's surface.

More particularly, the present invention is directed to an improved arrangement for sensing the presence of a vehicle either at rest or moving past a given location, and for producing a time limited output signal in response thereto. The vehicle structure may comprise non-uniformly distributed masses of different materials having a relative magnetic permeability greater than unity, so that the magnetic permeability of the vehicle is different from one portion to the next.

With an increasing number of automotive vehicles operating along heavily congested streets and highways, there is a growing need for a simple, reliable, low-cost method and apparatus for sensing the presence of the vehicles at prescribed locations along highways, freeways, turnpikes, etc., and at intersections between roads, as well as locations within and along vehicular tunnels and bridges.

Many different traffic sensing methods and apparatus are currently in existence. For example, one commonly used sensor employs an electrical switch which is mechanically operated by a treadle installed at the surface of a roadway. Mechanically operated sensors are not only expensive to install, but are also subject to considerable wear and require frequent maintenance, and are highly vulnerable to adverse weather conditions with attendant ice, snow and mud. Certain types of sub-surface sensors, such as those employing wire coils, have also been used. The coils serve as either a means for producing a signal voltage in response to changes in the earth's magnetic field caused by a passing vehicle, or as an inductor the reactance of which changes when the structure of a vehicle passes near it. Generally, the coils of such sensors are rather large in size and are not only expensive to install, but are also undesirably affected by varying road conditions caused by weather, as well as by spurious signals inductively picked up from power lines and other electrical equipment which may be operated nearby. Moreover, in the prior use of sub-surface sensors, it has been the practice to install the sensors no farther below the surface of a highway than is required to protect the sensors from the physical shock and vibration produced by heavy vehicles, such as trucks and buses.

Extensive studies of the problem of vehicle detection have led to the development of one form of traffic sensing system which is based upon the measurement of the absolute intensity of the earth's magnetic field at prescribed locations along a designated pathway, such as a roadway or vehicular parking area. For this purpose, a flux gate or other magnetometer may be employed. The vehicle sensing element of the magnetometer may be small in size and embedded directly beneath the surface of the roadway. Owing to the fact that in fabricating automotive vehicles, materials are used having a relative magnetic permeability greater than unity, the absolute intensity of the magnetic field acting upon the embedded sensing element will generally increase as the vehicle passes over its location. This increase will then be reflected in a change in the amplitude of an output signal delivered by the magnetometer, which in turn can be made to actuate suitable signal responsive means. However, during the time a moving vehicle is passing over the embedded sensing element of such a magnetometer, numerous perturbations are generally produced in the intensity of the earth's magnetic field. Multiple peaks corresponding to the perturbations appear in the magnetometer output signal and are troublesome if it is desired to determine accurately the number of vehicles which pass the sensing element over a given time period. This is because some of the magnetic field perturbations caused by a moving vehicle may reach levels having an absolute value less than ambient magnetic field intensity, that is, the magnetic field intensity as detected by the magnetometer sensing element in the absence of a vehicle. Not only does one type of vehicle produce fewer or more of such perturbations than another type of vehicle, but the maximum value to which the field intensity is increased as represented by any one of such perturbations also varies from one vehicle type to another. Investigation has shown that the above-described variations in the output signal from the magnetometer in response to amplitude levels of magnetic field intensities below the ambient magnetic field value are due to the unique characteristics of magnetic fields, and the non-uniform distribution of the masses of materials having high magnetic permeability making up automotive vehicles. Hence, it becomes impossible to establish a critical amplitude threshold against which to compare the output signal of the magnetometer which, if exceeded thereby, constitutes an accurate indication of the passing of but one vehicle. Ideally, if all of the variations in the magnetometer output signal caused by a passing vehicle corresponded to magnetic field intensity levels having an absolute value above ambient, the establishment of such a threshold would be feasible.

One solution to the problem is to employ two magnetic sensors (magnetometers) suitably spaced apart along the roadway in the direction of vehicular travel. A latching circuit may then be coupled to the output circuits of the two magnetometers such that the latching circuit will be set or latched when the intensity of the field acting on the first magnetometer rises above a predetermined rather low threshold value, while it will be "reset" or "unlatched" when the intensity of the field acting on the second magnetometer likewise rises above a similar threshold value. One complete set-reset cycle of the latching circuit therefore represents the count of one passing vehicle. This arrangement, although useful, is undesirably expensive in that two sensors are required along with associated electronic circuitry.

In a copending application, now U.S. Patent No. 3,249,915, assigned to the same assignee, an invention of a vehicle detector comprising a single sensor and associated stabilizing and thresholding circuitry is disclosed. The vehicle detector registers a signal or count for each detected vehicle. The signal starts when the detector senses an increase in the magnetic field intensity above a first threshold level and terminates when the sensed magnetic field intensity falls below a second threshold level. Such a vehicle detector has been proven to operate successfully under most circumstances. Its only apparent shortcoming seems to be that the duration of the signal produced by it is a function of the length of time the detector senses, due to the presence of a vehicle, an increase in the detected magnetic field between the two threshold levels. As a result, if a vehicle which has been sensed by the detector causes the output signal to be initiated and thereafter the vehicle stops for some reason, due either to mechanical failure or heavy traffic, the detector will continue to produce an output signal until the vehicle finally moves far enough for the sensed magnetic field intensity to drop below the second threshold level. Such a feature is undesirable when a plurality of detectors have their output signal lines interconnected to a single traffic control center or computer. In such an arrangement, if a vehicle stalls above any one of the detectors, that detector may continue to produce an output signal for an indefinite time period and thereby block or saturate the input lines to the traffic control center so that signals from other detectors cannot be properly recorded or registered.

The present invention eliminates the foregoing disadvantage by providing an improved vehicle detector which, though similar in some respects to the detector heretofore referred to, is less complex in circuitry and provides a time-limited output signal for each detected vehicle, so that regardless of how long a single vehicle is detected, the output signal corresponding thereto is limited to a preselected maximum time period or duration.

More specifically, the present invention, as well as the prior invention previously referred to, is based upon two observations. The first is the recognition of the fact that magnetic lines of force representing a magnetic field are both elastic in character and tend to repel one another. When an unmagnetized body having a magnetic permeability greater than unity is placed within a magnetic field, it will cause the lines of force representing the field to bend or converge toward the body. This results in an increase in the magnetic flux density in areas adjacent the body which may be observed upon planes normal to the direction which the lines of force would follow in the absence of the body.

Owing, however, to the repelling influence magnetic lines of force have upon one another, this above converging effect produced by the body causes only a localized distortion of the lines of force representing the ambient field. That is, just as the body effectively caused the magnetic lines of force to converge, the lines of force immediately after passing through the body repel each other and commence to diverge. Accordingly, at a relatively short distance from the body, the lines of force may assume a uniform distribution corresponding to the ambient conditions of the magnetic field in the absence of the body. Moreover, through areas or planes immediately adjacent the body, the flux density will be below that of ambient, since certain of the lines of force otherwise present in the areas adjacent the body have been effectively diverted and caused to pass through the body.

Accordingly, it will also be seen that if two or more, but a limited number, of such bodies are closely spaced apart from one another along a direction normal to the ambient magnetic field, the flux density through those areas on the plane as may be defined by projecting the bodies thereon will be greater than ambient, while through areas on the plane between the projections it will be below ambient.

The above example is closely analogous to the body of an automotive vehicle in which masses, such as the engine, transmission and differential, are generally spaced apart within the body. However, as an examination is made of the average field intensities near the bodies by sampling the average flux densities through sampling areas all of the same specified shape and size but at different locations upon a sampling plane, while at the same time successively spacing the plane at greater distances from the body, there will be found a critical distance from the body, for the specified size of sampling area, at and beyond which such flux density measurements, although decreased in value, will always be above ambient, both within the projection of the bodies upon the plane as well as between the projections themselves. The greater the size of the sampling area, the smaller this critical distance will be.

As a corollary to the foregoing, the second observation is that common forms of magnetic field sensing devices do not measure the magnetic field on a classical point-to-point basis as would be desired in their application to high detail mapping of magnetic field patterns. Indeed, most magnetic field sensing devices may be regarded as having an effective "flux collecting aperture" which may be of substantial area and assume various shapes. In the case of a flux gate magnetometer, this aperture is of an area and shape defined by the size and shape of the magnetically permeable materials used in the fabrication of the magnetometer sensing unit, such as the magnetically saturable strip of the magnetometer, its associated flux collecting elements, if any, and the wire coils surrounding the strip. In a sense, therefore, such a magnetometer is responsive to the average magnetic field acting on an area corresponding in size and shape to the effective flux collection aperture of the magnetometer or, put differently, it gives an indication of the average flux density through this area.

Accordingly, therefore, advantage is taken of the fact that if a number of point-by-point measurements are made of the instantaneous value of flux density within a specified area on a sampling plane normal to the earth's ambient magnetic lines of force, and the plane is critically distanced from the surface of a roadway, then the average of all such measured values will be above ambient whenever a vehicle is positioned adjacent a predetermined location on the roadway. Furthermore, an accurate count may be made of vehicles passing the location by detecting the variations in the flux density values through a given area and producing an output signal or registering a single count for each continuous series of detected values, all of which are above ambient with at least one value in the series rising above a first specified magnitude, and where the series includes at least one subsequent value which is less than a second specified magnitude lower than said first specified magnitude.

In accordance with the foregoing, the present invention permits the realization of an improved vehicle detecting system wherein magnetic field detecting means having a specified effective flux collection aperture is positioned adjacent the surface of a roadway, with the axis of the detecting means in substantial alignment with the earth's ambient magnetic field. The detecting means is positioned relative to the roadway so that its effective flux collection aperture is caused to coincide with a specified area on a plane transverse to the earth's ambient magnetic lines of force, through which specified area the instantaneous average magnetic flux density during the passing of a vehicle does not fall below ambient. Means, including stabilizing and time-limiting means, are then coupled to the detecting means to produce an output signal whose time period or duration is limited to a predetermined maximum value for registering a single count for each detected vehicle. The stabilizing and time-limiting means minimize variations in the operation of the apparatus due to temperature changes or variations in amplitude of signals provided to the magnetometer from energizing means, and control the improved vehicle detector so that its output signal is limited to have a maximum time duration irrespective of how long a single car may be detected.

A preferred form of the present invention includes a novel signal responsive threshold control system which conditions the registration of each count upon the intensity of the detected magnetic field exceeding a first threshold level, following which it must fall below a second lower threshold level. In accordance with the present invention, the first and second threshold levels are respectively established at amplitude levels above and below that level corresponding to the lowest absolute value of above-ambient flux density which is produced during the passing by the prescribed location of any one of the various types of vehicles it is desired to count.

A better understanding of the invention may be had from the following detailed description of one embodiment, taken in conjunction with the drawings, in which.

In order to facilitate a better understanding of the principles underlying the operation of the improved vehicle detector of the present invention, attention will first be given to certain phenomena associated with the earth's magnetic field and the effects on the field of a magnetically permeable body such as an automotive vehicle.

Figures 1, 2, 3, 4, 5, 6, 7, 8:
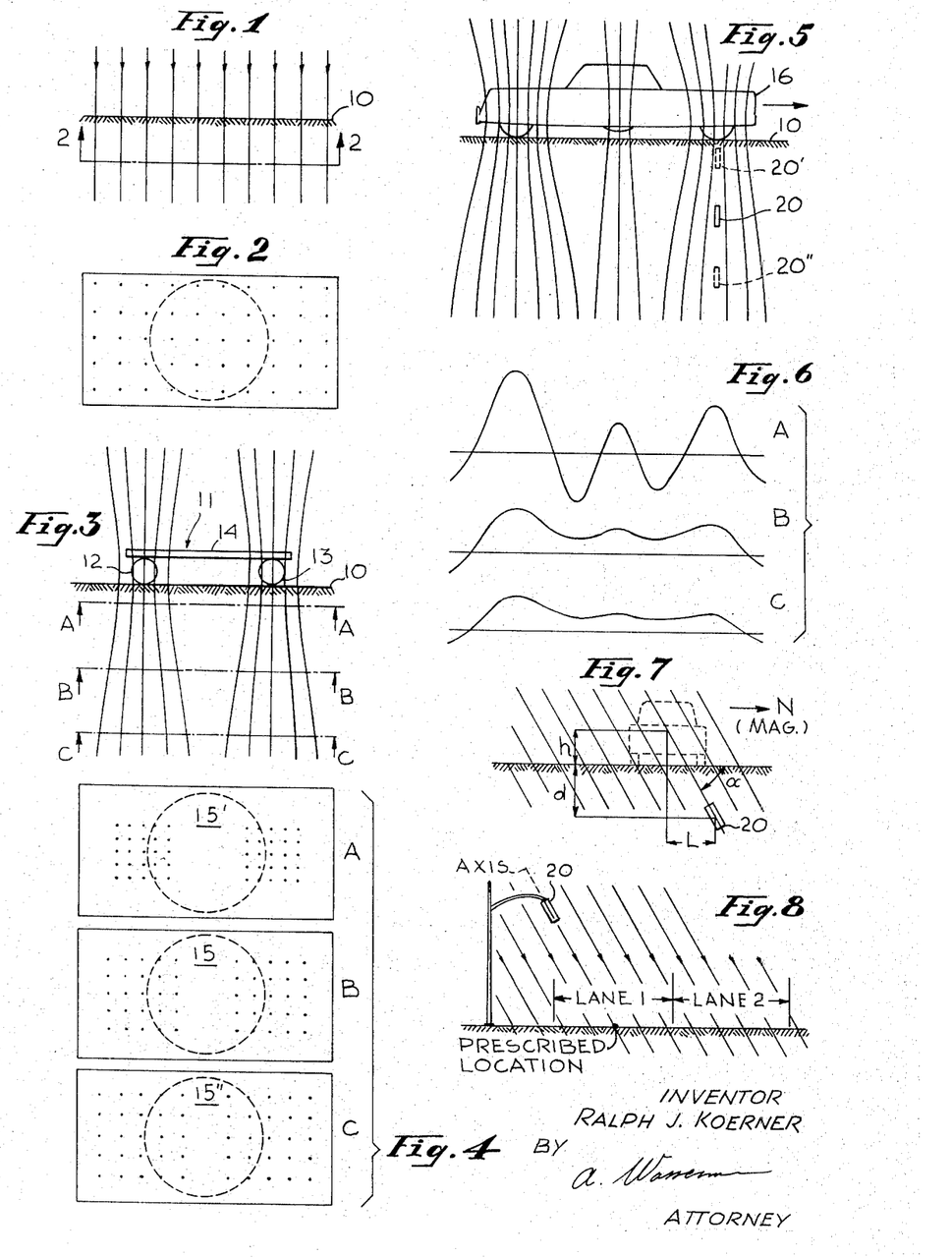
FIGURE 1 is a diagrammatic illustration of the earth's ambient magnetic field as it enters the surface of the earth viewed from a location in the northern hemisphere looking in a generally northerly direction towards the earth's north magnetic pole.
FIG. 2 is a diagrammatic illustration of the earth's magnetic field taken along a plane defined by the line 2—2 of FIG. 1.
FIG. 3 is a diagrammatic illustration of the earth's magnetic field taken in a location and viewed in a direction corresponding to FIG. 1 and illustrating the concentration of the earth's magnetic field produced by the presence of a magnetically permeable body.
FIG. 4 comprises a series of diagrammatic illustrations of the earth's magnetic field as it appears on the planes defined by the lines A—A, B—B, and C—C in FIG. 3.
FIG. 5 is a diagrammatic illustration of an automotive vehicle passing along a path above apparatus for sensing the value of the earth's magnetic field in accordance with the invention.
FIG. 6 comprises a series of graphical illustrations of electrical signals which may be derived from a magnetic field sensing device located in different positions as shown in FIG. 5.
FIG. 7 is a graphical illustration of the earth's magnetic field taken from a location in the northern hemisphere and viewed in a generally westerly direction with reference to the earth's north magnetic pole and showing the manner in which a magnetic field sensing device may be positioned in accordance with the present invention where the magnetic field sensing device is to be positioned below the surface of a vehicle path.
FIG. 8 is a diagrammatic illustration of the earth's magnetic field taken from a location in the northern hemisphere and viewed in a generally westerly direction with reference to the earth's north magnetic pole, illustrating the manner in which a magnetic field sensing device may be positioned in accordance with the invention where the magnetic field sensing device is to be located above a vehicle path.

In FIG. 1 there is illustrated diagrammatically the configuration of the ambient earth's magnetic field in the northern hemisphere viewed in a direction looking towards the earth's north magnetic pole. As may be seen in FIG. 1, the earth's magnetic field is represented by magnetic lines of force which are generally parallel and which enter the surface of the earth 10. It will be noted in FIG. 1 that the earth's magnetic field is uniform where it is assumed that no adjacent magnetically permeable object or material effects a distortion or concentration thereof. Uniform distribution of the earth's magnetic field may also be seen from FIG. 2 of the drawings which constitutes a diagrammatic illustration of the configuration of the field as seen along a plane below the earth's surface defined by the line 2—2 in FIG. 1. In conventional fashion, the lines of force in the diagram of FIG. 2 are shown at dots indicating that the direction of the field as shown is out of the plane of the drawing of FIG. 2 in a direction towards the observer. It further should be noted that the graphical illustration of FIG. 2 corresponds to the configuration of the earth's magnetic field at locations both closer to the earth's surface 10 than the line 2—2 and farther from the earth's surface 10.

The uniform nature of the earth's magnetic field as shown in FIGS. 1 and 2 obtains in the absence of any adjacent magnetically permeable object. However, upon the introduction of a magnetically permeable object into the earth's magnetic field in the region under consideration, a concentration of the field within the magnetically permeable object takes place so that the magnetic field lines are no longer uniformly distributed but converge upon the magnetically permeable object. By virtue of the fact that automotive vehicles contain relatively large quantities of magnetically permeable material, it has been proposed that the presence or passage of a vehicle may be detected or sensed by measuring the value of the earth's magnetic field near the location of the vehicle. Due to the concentration of the earth's magnetic field in the magnetically permeable portions of an automotive vehicle, the presence or passage of such a vehicle produces perturbations in the earth's magnetic field which may be sensed as an indication of the presence of the vehicle.

However, the magnetically permeable material in substantially all vehicles is distributed in such a way as to produce a number of different regions of concentration of the earth's magnetic field with intermediate regions in which the field may drop below the ambient value obtaining in the absence of the presence of such a vehicle. This phenomenon is illustrated in FIGS. 3 and 4 of the drawings in which FIG. 3 shows a hypothetical automotive vehicle 11 which has been greatly simplified and for purposes of illustration may be considered to comprise two magnetically permeable cylinders 12 and 13 corresponding to the wheels and axles of a conventional vehicle upon which is borne a magnetically permeable plate 14 corresponding to the body and chassis of the vehicle. In any event, as may be seen in FIG. 3, the earth's magnetic field lines are concentrated in the region of the magnetically permeable portions of the hypothetical vehicle 11. Moreover, it may be noted that the portions which have the greatest mass of magnetically permeable material are correspondingly effective in producing a greater convergence of the magnetic field lines.

In order to facilitate an understanding of the effects of the presence of a magnetically permeable vehicle in the earth's magnetic field, FIGS. 4A, 4B and 4C diagrammatically illustrate the configuration of the field on planes beneath the surface of the earth 10 as shown by the corresponding lines A—A, B—B, and C—C of FIG. 3. In a region near to the earth's surface 10, as shown in FIG. 4A, the earth's magnetic field is concentrated in areas constituting a projection of the positions of the vehicle 11 on the plane. Moreover, between the areas of concentration of the magnetic field, it will be noted that fewer magnetic flux lines appear than in the representation of the earth's ambient magnetic field of FIG. 2. This indicates that the concentration of the earth's magnetic field by the magnetically permeable portions of the hypothetical vehicle 11 produces a magnetic field value less than the ambient field value in regions intermediate of the regions in which the earth's magnetic field is concentrated. Accordingly, by measuring the average value of the earth's magnetic field within a given area 15' on a given plane in the absence of a vehicle and by comparing these values with the values obtained in the presence of a vehicle, it has been found that in regions near to the earth's surface average values of magnetic flux density over a given area are often less than those obtained in the absence of a vehicle.

In prior art systems in which magnetic field sensing devices are employed for detecting the presence of a vehicle, the perturbations produced by the alternate concentrations and intermediate less-than-ambient field intensity values have resulted in an output signal being generated having several peaks between which the signal falls below the ambient value which is obtained from the magnetic field sensing device in the absence of a vehicle. Due to the fact that the configuration of magnetically permeable materials in vehicles differs from model to model, and hence the number of peaks in the output signal varies, it has been impossible to establish any single mechanism for reliably determining whether an output signal or a measured set of magnetic field values taken at or immediately adjacent the earth's surface represents one or more vehicles. Since all known vehicle detecting systems which sense magnetic field values have taken their measurements in the region near to the earth's surface 10, such systems have suffered from such disadvantages.

In accordance with the previously referred to prior invention, however, it has been discovered that the characteristics of the earth's magnetic field enable measurements to be taken in regions where a reliable determination may be made of the presence of each individual vehicle. FIG. 4B illustrates the distribution of the earth's magnetic field on a plane taken along line B—B of FIG. 3. As shown in FIG. 4B, the presence of the vehicle 11 produces a concentration of the lines of force representing the earth's magnetic field in a pattern which is somewhat similar to that illustrated in FIG. 4A. However, in FIG. 4B, the degree of concentration of the earth's magnetic field is somewhat less than that shown in FIG. 4A. Furthermore, in between the areas in which the field is concentrated, the distribution of the earth's magnetic field lines indicates that over a given area of predetermined size and shape, such as the dashed circle 15, the average flux density is never less than that in the ambient field shown in FIG. 2. In accordance with the above-referenced prior invention, the earth's magnetic field is observed in an area as a plane such as that shown in FIG. 4B at a predetermined distance away from an automotive vehicle where the distribution of the earth's magnetic field within the given area will produce an average value of flux density above the earth's ambient field value. Therefore, the aforesaid problems associated with perturbations of the earth's magnetic field produced by an automotive vehicle which fall below the ambient value are overcome.

By way of comparison, FIG. 4C shows the distribution of the earth's magnetic field in a plane defined by the line C—C of FIG. 3. Here again, some concentration of the earth's magnetic field is visible. However, the degree of concentration is much less than that illustrated in FIG. 4B and even though an average value taken across the defined area 15" is above the ambient value, the degree of concentration is relatively low. This indicates that in determining the presence of a vehicle, the area of observation, which is of a specified shape and size, is preferably spaced from the roadway or vehicle by a distance not substantially greater than that which ensures an above-ambient flux density of a specified magnitude in and over the observation area during the passing by or presence over said area of those vehicles of interest having the lowest overall effective magnetic permeability.

A better understanding of this phenomenon may be had by considering in more detail the nature of the magnetic field distortion produced by vehicles as shown in FIGS. 3 and 4. In this connection, and as hereinbefore and as will be hereinafter intended, the concept of a vehicle being present over or passing by a given area of observation refers to the above-ambient flux density condition produced in and over the observation area by reason of the vehicle's influence on the earth's magnetic field passing through the observation area. Consider, for example, the previously referred to FIG. 4B. Here it will be seen that a body, such as an automotive-vehicle (if it is not magnetized), will usually cause the average flux density to decrease through areas immediately adjacent the periphery of the body of the vehicle. Thus, a vehicle, as it passes over or near an observation area, will cause a rarefication or diminution of the average flux density through the observation area immediately preceding and immediately following its passing. It will be clear, therefore, that it is during the time periods between the instant the influence of a vehicle first causes an above-ambient increase in the flux density through the area of observation and the next successive instant in time such vehicle causes a reduction in this flux density to an ambient value that an improved apparatus may be operated to register the presence of such a vehicle. Thus, a series of magnetic field values can be measured in the presence of a vehicle, which values will continuously be above the earth's ambient magnetic field value.

Even though for each passing vehicle the series of measured values may fluctuate to some degree due to the concentrations of the magnetic fields produced by different portions of the vehicle, yet, since none of the measured values returns to an ambient magnetic field value, it may be concluded that the registration of a single vehicle may be made for every consecutive series of values which first rise above an ambient magnetic field value and stay above the ambient magnetic field value, dropping back to the ambient magnetic field value only at the conclusion of the passage of the vehicle. In the practice of the present invention, a given area of observation of given size and shape is selected. The plane in which the area of observation lies may be positioned from the vehicle transverse to the lines of the earth's magnetic field, and a series of measurements of the average flux density of the earth's magnetic field in the given area may be made with a determination being made from the measured series of values as to the passage of each vehicle through registering a count for every consecutive series of measured values substantially all of which are above the ambient value of earth's magnetic field. Although the measurements may be derived manually by a point-to-point measurement of the values of the magnetic field falling within a predetermined given area on a plane distanced from the path of the vehicle as suggested above, a preferred arrangement contemplates the positioning of a particular magnetic field sensing device at a location at which the device senses the average value of the magnetic field falling within a given area of specified shape and size at the defined location on a plane transverse to the earth's magnetic field lines. The manner of positioning such a device responsive to flux in a specified observation area and the electrical signals which may be obtained thereby are illustrated in FIGS. 5 and 6 of the drawings and will be discussed hereinafter.

First, however, consideration will be given to what will also hereinafter be termed the "effective flux collecting aperture" of a given magnetic field sensing device and how its size and shape must be taken into consideration in practicing the present invention.

As will be seen, once the proper location of a given observation area of given size and shape has been determined, a field sensing device such as a magnetometer is required having an effective flux collecting aperture which is of a shape and size which matches or completely envelops the given observation area.

As noted previously, point-by-point magnetic field measurement techniques do not obtain in the use of a magnetic sensing element having itself a magnetically permeable saturable strip. From a practical standpoint, the size and shape of the area in which magnetic fields will be sensed by a particular magnetometer may be discovered by placing the magnetometer in a uniform magnetic field and observing the amplitude changes in its output signal as a very small sphere of highly magnetic permeable material is moved about a plane (as on a glass plate) displaced from the magnetometer and normal to the effective axis of the magnetometer. It is useful to further consider the fact that the area in which the magnetic field is sensed by the magnetometer may be referred to as the effective aperture and in the case of the flux gate magnetometer which is made up of a substantial mass of highly magnetically permeable material will appear smaller as plotted on planes near the magnetometer than on planes more distant therefrom. Owing to the mentioned converging effect of a magnetic field in the presence of magnetically permeable materials, and the repelling effect the field lines have on one another, there will exist for each magnetometer a critical distance from the sensing unit beyond which the size of the effective aperture will not increase. This is generally quite close to and at a specified distance from the sensing unit.

FIG. 5 is a diagrammatic illustration looking towards the earth's north magnetic pole from a location in the northern hemisphere with an automotive vehicle 16 passing along a pathway on the earth's surface 10 in a generally easterly direction.

The particular automotive vehicle 16 shown in FIG. 5 comprises a structure in which magnetically permeable materials are concentrated in the regions of the front axle, the rear axle, and the transmission, a corresponding convergence of the lines of force representing the earth's magnetic field is shown. The proper location for a magnetic field sensing device such as a magnetometer 20 is shown on a level below the earth's surface 10 at which the magnetic field sensing device is adapted to provide an output signal corresponding to the average flux density through an area at a predetermined distance below the surface 10 transverse to the earth's magnetic field as described in connection with FIGS. 3 and 4. As noted, the magnetometer 20 is adapted to provide a signal corresponding to the flux passing through a given area 15 on a plane as shown in FIG. 4B. For comparison purposes, two other positions for the magnetometer 20 are illustrated in phantom in FIG. 5. In a near position to the earth's surface 10 the magnetometer is designated as 20', while in a far position the magnetometer is designated as 20''.

The idealized waveforms of FIG. 6 represent output signals which may be derived from a magnetic field sensing device in the arrangement of FIG. 5. FIG. 6A corresponds to the output signal produced when the magnetometer 20' is in the near-to-the surface position. FIG. 6B represents the output signal produced by the magnetometer 20 in the predetermined position in accordance with the present invention, and FIG. 6C corresponds to the output signal produced by the magnetometer 20'' in the far position as shown in FIG. 5.

As an automotive vehicle 16 passes along the path on the earth's surface 10, the magnetometer 20 functions to provide an output signal corresponding to the average flux density within a given area on a predetermined plane. Concentration of the earth's magnetic field in the regions of high magnetic permeability of the vehicle 16 is readily apparent from an inspection of the electrical signals of FIG. 6. However, the waveform of the magnetometer 20' at or near the surface of the earth 10 (FIG. 6A) illustrates that the output signal follows amplitude variations which rise above and fall below the ambient value obtained in the absence of a vehicle. This leads to a signal having multiple peaks with the attendant necessity for providing some means for determining whether or not a series of amplitude variations in the signal represents one or more vehicles as described above. However, with the magnetometer 20 being placed in a position in accordance with the present invention, as shown in FIG. 6B, the output signal follows a series of consecutive values rising above the ambient value and falling back to the ambient value only upon the passage of the vehicle from the location of the magnetic field sensor. The result is that the signal of FIG. 6B uniquely identifies the passage of a single vehicle. The waveform of FIG. 6C corresponds to the placement of the magnetometer shown at 20'' farther away from the vehicle path leading to the signal of FIG. 6B. As shown in FIG. 6C, the signal rises from ambient value and returns to ambient value, but it is of relatively low amplitude and is therefore subject to disturbances caused by extraneous effects such as noise or the passage of a magnetically permeable body in an adjacent region, such as a vehicle passing in an adjacent traffic lane. Therefore, the optimum position for the placing of a magnetic field device such as the magnetometer 20 is that at which a substantial amplitude variation of the output signal appears but at which the signal does not fall below the ambient value during the passage of the vehicle. This optimum location may be determined for a particular magnetic field sensing device by gradually lowering the magnetometer below the surface of a roadway until the effective flux collecting aperture of the magnetometer encompasses a given area on a selected plane transverse to the earth's ambient magnetic field as described above.

Although the diagrams of FIGS. 1, 3, and 5 illustrate the magnetic field lines as being vertical with respect to the earth's surface, it is well known that in most locations on the earth the magnetic field lines are inclined with repect to the surface. The inclination of the field lines in FIGS. 1, 3, and 5 may be seen when viewed from a transverse position. FIGS. 7 and 8 show the inclination as well as the proper position for a magnetic field sensing element with respect thereto in accordance with the present invention. Being angled with respect to the earth's surface, it is sometimes considered that the earth's magnetic field has both a vertical and a horizontal component, with the vector sum of the vertical and horizontal components representing the field and making an angle with the earth's surface which is sometimes referred to as the angle of inclination or angle of dip. FIGS. 7 and 8 may be considered to be taken from a position in the northern hemisphere looking in an easterly direction.

As shown in FIG. 7, the magnetic field sensing element 20 is positioned beneath the earth's surface at an angle with reference to the earth's surface 10 but in a position in which the element is aligned with the earth's magnetic field lines in an ambient condition, i.e., in the absence of a permeable body such as a passing vehicle. By this means, a maximum output signal may be provided from the magnetic field sensing element since the effective flux collecting aperture will encompass an area on a plane transverse of the earth's ambient magnetic field lines. In a similar fashion, FIG. 8 shows the magnetometer 20 suspended above the earth's surface and aligned with the earth's ambient magnetic field lines. The correct location of the sensing element may be theoretically determined in the absence of any interfering mass of magnetically permeable material in the earth by the equation $$L = \frac{d+h}{\tan \cdot \alpha}$$

where $h=$ the height of the effective magnetic height of a vehicle above the road surface,
$d=$ the depth of the magnetometer below the road surface,
$L=$ optimum lateral displacement of the magnetometer from directly beneath the vehicle's effective magnetic center, and
$\alpha=$ local dip angle of the earth's magnetic field.

For example, the dip angle of the earth's magnetic field at Los Angeles, California, is 60°. Furthermore, it has been discovered that the effective magnetic height of the average vehicle is approximately 12 inches. By way of example, where the magnetometer is constructed in the manner which is described below in connection with FIGS. 13–15, a flux collecting aperture may be determined which is such that an appropriate distance below the surface is 20 inches.

Figure 9:
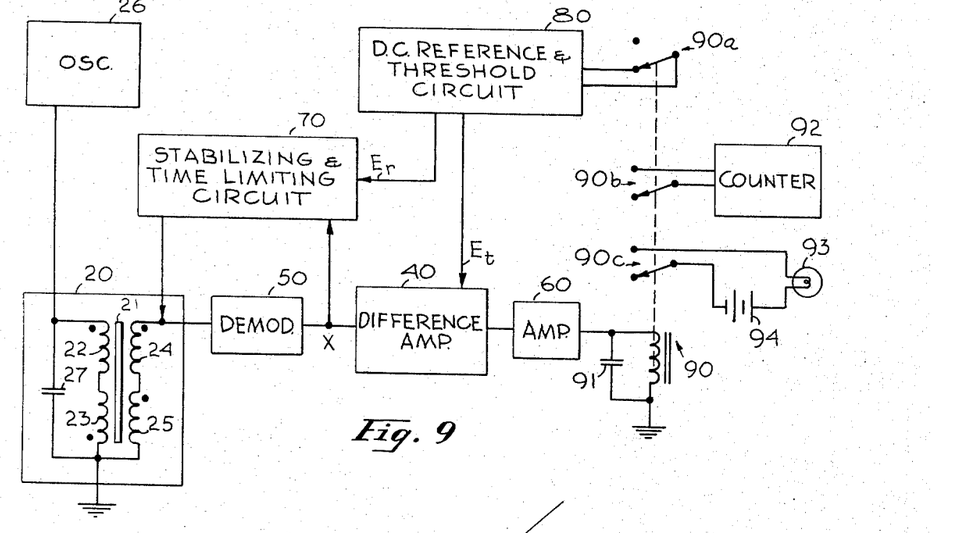
FIG. 9 is a combined block and schematic circuit diagram of apparatus for sensing vehicles in accordance with the invention.

In FIG. 9 there is shown a novel system for use in conjunction with a flux gate magnetometer for performing the magnetic field sensing operation and vehicle detection in accordance with the invention. Parts of the circuitry shown therein are similar to those incorporated in the vehicle detector of the prior invention hereinbefore referred to, one of the main novel features being a stabilizing and time-limiting circuit to be hereinafter described in detail. This circuit greatly simplifies the circuitry required for stabilizing the operation of the vehicle detector, and also provides means for controlling the duration of the detector's output signal in response to each detected vehicle. The magnetometer element 20 may be positioned as shown in FIGS. 5, 7, and 8 with its flux collecting aperture being arranged to sense the average magnetic field intensity in a given area on a plane transverse to the earth's magnetic field as previously described.

The magnetometer 20 shown in FIG. 9 comprises a magnetically saturable element 21 forming a core upon which a plurality of windings 22, 23, 24, and 25 are placed. The windings 22 and 23 comprise the energizing windings and are connected serially with their respective winding directions being conventionally illustrated by means of dots. Thus, it will be seen that the winding 22 produces a magnetic field in response to current flow in a given direction which is opposite to the magnetic field produced by the winding 23 in response to current flow in the same direction. Accordingly, one section of the saturable strip 21 is magnetized in a first direction in response to current flow through the winding 22, while a second lower section of the saturable strip 21 is magnetized in an opposite direction in response to current flow in the winding 23. The serially connected windings 22 and 23 of the magnetometer receive an alternating energizing current from a suitable source such as an oscillator 26. A capacitor 27 is selected to provide a parallel resonant circuit in combination with the inductances of the windings 22 and 23 at the frequency of the oscillator 26. Thus, the circuit is tuned so as to operate at maximum efficiency, requiring a minimum amount of power from the oscillator 26. The output windings 24 and 25 are also connected serially except that their orientation is alike as indicated by the reference dots.

The alternating current wave applied to the energizing windings 22 and 23 is such that the field applied to the saturable core 21 is driven to magnetic saturation for a major portion of each half-cycle. Since the output windings 24 and 25 are connected oppositely as compared to the energizing windings 22 and 23, in the absence of an externally applied field to the saturable core 21, any voltages which may be induced in the output windings 24 and 25 are effectively cancelled. That is, in the absence of an external magnetic field, the saturable strip 21 is brought to the same degree of saturation in its upper section as in its lower section on each half-cycle of the alternating current energizing wave.

Further, due to the fact that the windings 22 and 23 are oppositely wound, voltages are induced in the output windings 24 and 25 which are oppositely phased so as to effectively be cancelled in the output circuit. However, assuming that an external magnetic field of a given direction passes through the saturable strip 21, either the upper or the lower section of the magnetometer is brought to a saturation level by each half-cycle of the alternating current passing through the windings 22 and 23 before the other section is brought to saturation level. The result is that transformer action ceases (clipping occurs) in one part of the magnetometer on each half-cycle of the applied alternating current wave prior to the cessation of transformer action in the other section. Therefore, for each half-cycle of applied alternating current from the oscillator 26, a pulse appears in the output circuit, with the frequency of the output pulses being twice that of the frequency of the oscillator 26, inasmuch as one such pulse appears for each half-cycle of the wave from the oscillator 26. Accordingly, whenever a magnetic field is impressed upon the saturable strip 21, there is produced an alternating current wave of double the energization frequency and having an amplitude corresponding to the magnitude of the externally applied magnetic field. Thus, the magnetometer shown in FIG. 9 is adapted to function as a magnetic field sensing device. This arrangement is similar to that employed in the invention hereinbefore referred to.

Figure 11:
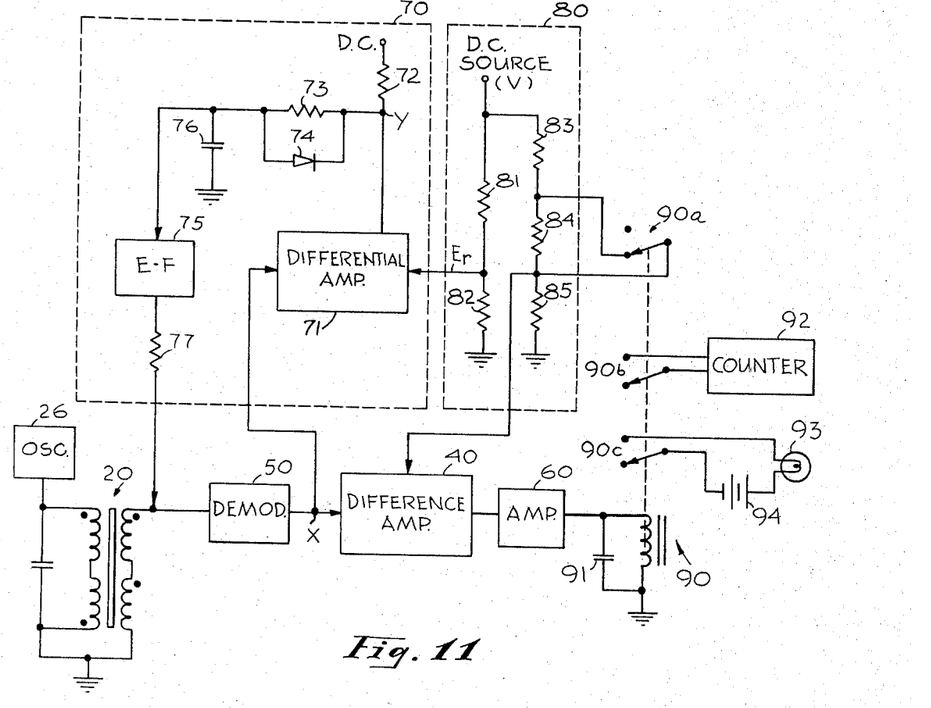
FIG. 11 is a schematic diagram similar to FIG. 9 but with greater schematic detail.
Figure 12:
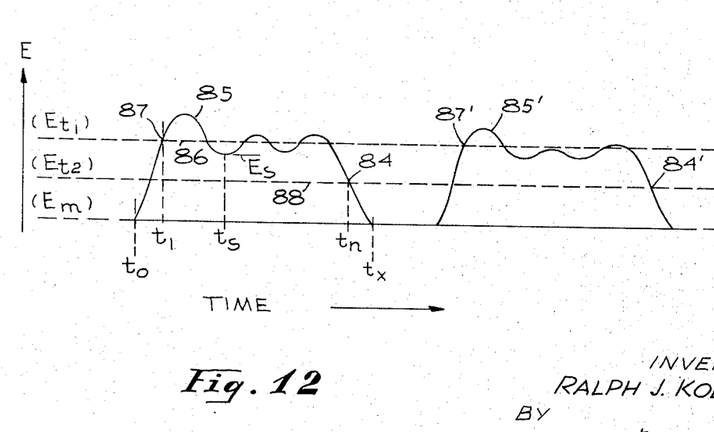
FIG. 12 is a set of graphical illustrations of various electrical signals appearing in the arrangement of FIGS. 9 and 10 plotted as a function of time.

In practical systems utilizing magnetic field sensing elements such as flux gate magnetometers, it has been found that the output signal from the magnetometer will be proportional to the detected magnetic field. However, some variations in the output signal will occur even with a constant value of applied magnetic field. These variations are caused by changes in the operating levels of the various subsystems associated with the magnetometer. It has been found that drifting of the frequency of oscillator 26 and amplitude changes in the oscillator output cause at least a portion of the undesirable variations in the value of the magnetometer output signal. In addition, it has been noted that temperature changes and small variations in the detected magnetic field due to reasons other than the passage of a vehicle to be detected may affect the magnetometer output signal and result in erroneous readings. Accordingly, in a preferred embodiment of the present invention, a stabilizing and time-limiting circuit 70, shown in FIG. 9 and in greater schematic detail in FIGS. 11 and 12, is employed, which substantially eliminates the aforementioned sources of error.

As shown in FIG. 9, the oscillator 26 energizes the input windings 22 and 23 of the magnetometer 20 by supplying a signal of relatively constant amplitude and frequency. The output signal from the magnetometer through its output windings 24 and 25 of the magnetometer 20 is coupled to a difference amplifier 40 through a demodulator 50 which filters and rectifies the output signal from the magnetometer. The difference amplifier 40 is also energized by a direct-current signal $E_t$ from a D.C. reference and threshold circuit 80. The difference amplifier 40 conventionally compares the two signals supplied thereto, and produces a usable output signal only when the rectified signal from the demodulator 50 exceeds the signal $E_t$ from the D.C. reference and threshold circuit 80.

Figure 10:
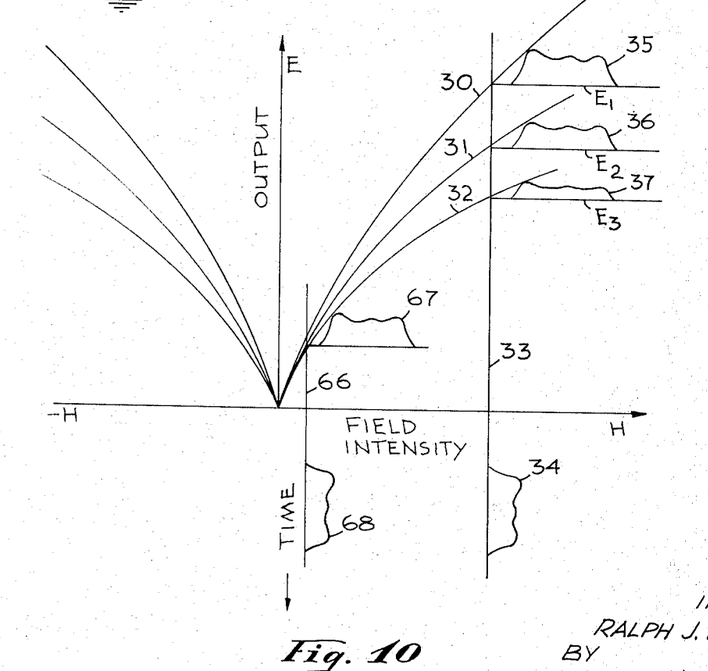
FIG. 10 is a graphical illustration of the response curve of a magnetic field sensing device in which the value of the output signal is plotted as a function of applied magnetic field value.

As previously stated, one of the advantages of the present invention over the detector of the referenced prior invention is a stabilizing and time-limiting circuit 70, hereinafter also referred to as a stabilizing circuit. This circuit, in addition to controlling the maximum duration of an output signal that may be produced in response to each detected vehicle, as will be described hereinafter in detail, also acts to establishing an ambient operating point of the magnetometer 20 which stabilizes its operation and further minimizes undesired effects on its operation caused by changes in the output signal of the oscillator 26. The significance of the stabilizing features of the stabilizing circuit 70 may better be understood by first analyzing the graphical illustration of FIG. 10. In FIG. 10, the response characteristics 30, 31, and 32 illustrate values of the output signals of the magnetometer 20 as a function of detected magnetic fields for three different amplitude values of energizing oscillator signals. When a magnetometer, such as that shown in FIG. 9, is in proper position to detect the passage of a vehicle, the earth's ambient magnetic field will establish a steady state operating condition as illustrated by a line 33. As seen therefrom, for the same value of detected magnetic field intensity, the value or amplitude of the output signal of the magnetometer may vary and be equal to $E_1$, $E_2$, and $E_3$ depending upon the operating condition of the magnetometer. Upon the passage of a vehicle producing perturbations in the earth's magnetic field, a variation in field intensity as indicated at 34 may be impressed upon the magnetometer along with the steady state ambient magnetic field. Thus, if the magnetometer's response characteristic follows the curve 30, the magnetometer produces an output signal having a waveform 35, which has relatively great amplitude variations since the slope of the curve 30 at its intersection with the steady state operating line 33 is steep. The next lower response characteristic 31, representing a somewhat different set of operating conditions of the magnetometer, produces an output signal having a waveform 36 with a base line $E_2$ lower than that of the waveform 35 and, in addition, smaller amplitude variations due to the fact that, at the intersection point between the line 33 and the curve 31, the curve 31 is not as steep as the curve 30. Still another set of operating conditions of the magnetometer is indicated by the response characteristic 32, which produces an output signal with a waveform 37 having the lower base value $E_3$ and lesser amplitude variations than either of the waveforms 35 or 36 due to the slope of the curve 32. From an inspection of FIG. 10 it is therefore apparent that the change in the operating conditions of the magnetometer, due to changes of the amplitude values of the signal from the energizing oscillator 26, may result in different output signals from the magnetometer, even though the affecting variation of the magnetic field intensity remains the same.

Such disadvantageous results are eliminated by the stabilizing circuit 70 which, as shown in FIG. 9, senses the output signal of the magnetometer 20 which is rectified by the demodulator 50. The stabilizing circuit 70 is energized by such an output signal, compares it with a reference signal or voltage $E_r$ supplied thereto from the D.C. reference and threshold circuit 80, and produces a biasing current which is supplied to the windings 24 and 25 of the magnetometer 20 as a function of the amplitude relationship between the two compared signals. The rate of the biasing current produced is a function of a time constant to be hereinafter explained, as well as the amplitude difference between the two signals. The effect of supplying a biasing current to the windings 24 and 25 of the magnetometer 20 is to impress a magnetic field upon the saturable element 21 of the magnetometer, the field having a direction which is subtractive with respect to the earth's ambient magnetic field applied thereto. As a result, the steady state operating conditions which is established by the magnetometer detecting the earth's ambient magnetic field illustrated by line 33 in FIG. 10 is changed to an apparent or biased steady state such as that illustrated by a line 66. As seen in FIG. 10, the apparent steady state output signal of the magnetometer 20 is substantially equal to $E_m$. As previously stated, this signal is compared in the stabilizing circuit 70 with the reference signal $E_r$, the stabilizing circuit 70 producing a biasing current sufficient to bias the magnetometer 20 so that its output $E_m$ is substantially equal to or slightly greater than $E_r$. Such an arrangement insures that in the absence of a detected vehicle the magnetic field intensity illustrated by line 66 which is effectively sensed by the magnetometer 20 produces a substantially constant output signal $E_m$, even though the operating point of the oscillator 26 may change. This becomes apparent from FIG. 10, since the three lines 30, 31, and 32, which illustrate different values of the output signals of the magnetometer for three different values of the energizing oscillator's signal amplitudes, cross the line 66 at substantially the same point. This is in clear contrast with the output signals the magnetometer would have produced in the absence of such biasing as indicated by the output signals of the magnetometer being equal to $E_1$, $E_2$, and $E_3$, depending upon whether operating line 33 crosses lines 30, 31, and 32, respectively.

Reference is now made to FIG. 11, wherein the stabilizing circuit 70 is shown in greater detail. As shown therein, the stabilizing circuit 70 comprises a differential amplifier 71, connected to the output of the demodulator 50 at a point designated X, thereby being energized by the rectified output signal of the magnetometer 20. The differential amplifier 71 is also energized by the reference signal or voltage $E_r$ from the D.C. reference and threshold circuit 80. The output of the differential amplifier 71 is connected at a point Y to a direct current (D.C.) source of potential through a resistor 72 and to one end of a parallel combination of a resistor 73 and a diode 74, the point Y being connected to the cathode of the diode. The other end of the resistor 73 and the anode of the diode 74 are connected to the input of an emitter follower 75, which is shunted to ground by a capacitor 76. The output of the emitter follower 75 is connected to ground through a serially connected resistor 77 and the windings 24 and 25 of the magnetometer 20. In the steady state, namely, in the absence of a vehicle, the differential amplifier 71 is operable to compare the amplitude of the rectified signal from the magnetometer 20 at point X with the reference signal $E_r$ and produce a signal so that the point Y is maintained at a potential level sufficient to cause the capacitor 76 to charge up through the resistors 72 and 73 to a predetermined level. This potential level at the input terminal of the emitter follower 75 is chosen so that the emitter follower 75 produces and supplies to the windings 24 and 25 of the magnetometer 20 sufficient biasing current so that its output signal after being demodulated by the demodulator 50 is substantially equal to $E_m$ (FIG. 10), which is substantially equal to the reference signal $E_r$. For example, assume that the magnetometer senses an ambient field intensity as illustrated by line 33 of FIG. 10, producing an output signal which is equal to $E_1$, and further assume that $E_r$ is adjusted to be equal to $E_m$ (FIG. 10). It is apparent from the foregoing description that, since the differential amplifier 71 is energized at point X by a signal $E_1$ whose amplitude is greater than $E_r$, the potential at point Y will rise so that the capacitor 76 charges up through the resistor 73 toward the potential at point Y. The charging time constant is, of course, a function of the capacitance of the capacitor 76 and the resistance of the resistor 73, the resistor 72 being much smaller than the resistor 73 and therefore not affecting the time constant substantially. As the potential across the capacitor rises, the emitter follower produces more biasing current, which is supplied to the windings 24 and 25 so that the apparent magnetic field intensity detected by the magnetometer is reduced until the level equals that illustrated by the line 66 (FIG. 10). At such time, the output signal of the magnetometer 20 equals $E_m$, which is substantially equal to $E_r$. Since the two signals are substantially equal, the output of the differential amplifier 71 will become lower so that the capacitor 76 is charged only by an amount necessary to continuously bias the magnetometer so that its output signal remains substantially equal to $E_m$ and $E_r$. Such an arrangement, therefore, clearly shifts the steady state operating point of the magnetometer 20 from that which is established by detecting only the earth's ambient magnetic field as indicated by line 33 (FIG. 10) to a biased or an apparent steady state operting point as indicated by line 66.

As previously stated, the response characteristics 30, 31, and 32 are extremely close together at the operating point defined by the new steady state operating line 66. The result is that any variations in the output signal of the oscillator 26 have a relatively small effect upon the output signal of the magnetometer 20 as represented by waveform 67, in response to a change in the detected magnetic field as represented by waveform 68. Moreover, the slopes of the curves 30, 31, and 32 are steep at their point of intersection with the line 66 so that a somewhat larger output signal is obtained from the magnetometer for the same variation in the detected magnetic field than that obtainable at the operting point defined by the line 33.

As noted previously, the actual signal appearing across the output windings of the magnetometer is an alternating signal of twice the frequency of the energizing signal from the oscillator. For purposes of illustration, the waveforms shown in FIG. 10 represent the envelopes of the signals appearing across the output windings of the magnetometer and correspond directly to the signals supplied by the magnetometer for demodulation and rectification.

Referring again to FIG. 9, the difference amplifier 40 produces a usable output signal only if the rectified signal from the demodulator 50 is greater than the D.C. signal $E_t$ supplied thereto from the D.C. reference and threshold circuit 80. The output of the difference amplifier 40 is supplied to a conventional D.C. output amplifier 60, which amplifies the signal from the difference amplifier. The output of the amplifier 60 is utilized to energize the coil of a relay 90, which has a plurality of contacts 90a, 90b, and 90c. The normally closed contact 90a is connected to the D.C. reference and threshold circuit 80, and the other two contacts 90b and 90c are normally open. The coil of relay 90 is shunted to ground by a capacitor 91 whose purpose will later be described. The contacts of the relay 90 are shown in FIG. 9 with the relay in a deenergized state.

From the foregoing description it becomes apparent that the stabilizing circuit 70, as a function of the reference signal $E_r$, controls the output signal of the magnetometer 20 to be equal to $E_m$ in the absence of a vehicle. The output signal $E_m$ is also supplied to the difference amplifier 40 which is also energized by the signal $E_t$. The amplitude of $E_t$ may be adjusted to be somewhat greater than $E_m$, so that in the absence of a vehicle the difference amplifier 40 does not produce an output signal. However, as soon as a vehicle is sensed by the magnetometer 20, its output signal will be greater than $E_m$, and as soon as it becomes greater than $E_t$ the difference amplifier 40 will produce a usable signal which, when amplified by the amplifier 60, will energize the relay 90 and switch the state of its contacts. The normally open contacts 90b and 90c may be utilized in various ways to register or indicate the detection of a vehicle. For example, a conventional electronic counter 92 may be connected between the contacts 90b to register a count each time the contacts are closed. Thus, the counter can total the number of vehicles passing adjacent the magnetometer over a desired time interval. Likewise, a conventional indicator light 93 may be connected in series with a battery 94 between the the contacts 90c to provide a visual indication of the passing of each vehicle. The indicator means, such as the counter 92 or light 93, may be, and probably would be, located remotely from the remainder of the apparatus.

Although the techniques described heretofore for the placement of a magnetometer sensing element and the stabilization thereof are adapted to provide an output signal from the magnetometer which may readily be distinguished as representing each vehicle sensed, the operation of the apparatus may be enhanced through the establishment of certain threshold levels of operation to achieve an even greater degree of accuracy in registering the passage of each vehicle. This is accomplished by the D.C. reference and threshold circuit 80, hereinafter also referred to as the threshold circuit, which operates to establish a first threshold level which determines the minimum magnetic field intensity above its ambient operating point which the magnetometer 20 has to detect in order to cause a usable output signal to be produced by the difference amplifier 40. The threshold circuit 80 may further operate to establish a second threshold level, lower than the first, below which the detected magnetic field intensity must fall before the output signal from the difference amplifier ceases.

As shown in FIG. 11, the threshold circuit 80 comprises a pair of resistive branches connected in parallel between a D.C. source of potential V and ground potential, one resistive branch comprising serially connected resistors 81 and 82, and the other resistive branch comprising serially connected resistors 83, 84, and 85. The junction point between the resistors 81 and 82 is connected to the differential amplifier 71 so that the voltage across the resistor 82 serves as the reference voltage or signal $E_r$ hereinbefore referred to. The junction point of the resistors 84 and 85 is connected to the difference amplifier 40 so as to supply it with the D.C. signal $E_t$ whose function has been previously described. In addition, the resistor 84 is connected across the normally closed contacts 90a of the relay 90. It is apparent from FIG. 11 that as long as the relay 90 is in a deenergized state (as shown) the resistor 84 is shorted by the normally closed contacts 90a, so that the potential across the resistor 85 which is supplied to the difference amplifier 40 is a function of the D.C. potential V and the resistance of the resistors 83 and 85. Hereinafter this value will be regarded as a first threshold level to be designated $E_{t1}$. From the foregoing description it is apparent that for the difference amplifier 40 to produce a usable output signal, which will in turn cause the coil of the relay 90 to be energized, the rectified output signal of the magnetometer (input to the difference amplifier 40) must exceed the level $E_{t1}$. However, a soon as this occurs due to the detection of a passing vehicle, which increases the detected magnetic field intensity and thereby increases the magnetometer's output signal, the relay 90 is energized so that the contacts 90a open and the resistor 84 is no longer shorted. As a result, the potential supplied to the difference amplifier is reduced from the previous level $E_{t1}$ to a second level hereinafter regarded as a second threshold level $E_{t2}$. $E_{t2}$ is lower in amplitude than $E_{t1}$ since the resistor 84 has now been added to the voltage divider. The relay 90 will remain energized so long as the output signal of the magnetometer 20 exceeds the second threshold level $E_{t2}$. Once the magnetometer's output signal falls below this level, the relay 90 is deenergized, causing the resistor 84 to be shunted, so that for the relay to again be activated, the output signal from the magnetometer 20 must again exceed the threshold level $E_{t1}$.

For a better appreciation of the importance of establishing a first threshold level and a second lower threshold level, reference is made to FIG. 12, which constitutes a graphical illustration of typical rectified output signals supplied to the difference amplifier 40 from the magnetometer. In FIG. 12, the waveform 85 represents the output signal produced in response to a first vehicle passing the magnetometer, while the waveform 85' represents the output signal produced in response to another vehicle, having a different distribution of magnetically permeable materials, passing the magnetometer. The first upper threshold value $E_{t1}$ is illustrated by a dashed line 86, and only when the waveform 85 rises from the ambient level $E_m$ above the level $E_{t1}$, as indicated at an intersection point 87, does the difference amplifier 40 provide an output signal which is amplified and used to energize the relay 90. Once relay 90 is energized, contacts 90a, which were previously closed, are now opened, whereby the second threshold level $E_{t2}$ is established, as indicated by dashed line 88. The establishment of such a lower threshold prevents intermediate fluctuations of the waveform 85 from affecting the operation of the circuit, because the difference amplifier continues to provide an output signal to keep relay 90 energized and contacts 90a open until the waveform drops below the second threshold value $E_{t2}$, as indicated by an intersection point 84. By this means, a single positive registration of the passing of a single vehicle is provided even though the waveform produced by the passing of the vehicle may fluctuate at a level above the ambient level. In similar fashion, but with a somewhat different configuration of amplitude variations, a waveform 85' appearing at the difference amplifier causes the relay to be actuated at an intersection point 87' with the first upper threshold level $E_{t1}$, with the relay remaining energized until the waveform drops below the second lower threshold level $E_{t2}$ at an intersection point 84'.

In accordance with the invention, the capacitor 91 (FIGS. 9 and 11) is connected across the coil of the relay 90 so as to render the relay insensitive to minor excursions of the output signal from the magnetometer below the lower threshold level. Such minor excursions may be caused by momentary interruptions in the signal due to extraneous effects or to sharply defined areas of irregular distribution of magnetically permeable materials in a vehicle. The operation of the circuit is such that the capacitor 91 is rapidly charged by the output signal from output amplifier 60, but discharges slowly through the relatively high resistance of the coil of relay 90.

In the foregoing description, the registration of each vehicle detected by the improved vehicle detector of the invention is accomplished by means of the relay 90 which is energized as each vehicle is detected by the magnetometer 20. It is apparent to one skilled in the art that other utilization means may be used to register or record the detected vehicles. For example, the output signal of the amplifier 60 or the output signal of the difference amplifier 40 may be directly supplied to a traffic control center which may use modern computing techniques to record or register the presence of each vehicle. Indeed, a plurality of detectors similar to the one described herein may be used to supply registration signals to a computer which may be operated to automatically control traffic signals as a function of the number of detected vehicles. Such an arrangement is highly desirable for modern traffic controlling; however, unless additional means are included for controlling the maximum duration of the output signal of each vehicle detector, the detection of a vehicle by one detector may interfere with the registration of vehicles by other detectors.

For a better understanding of the requirement of controlling the maximum duration of the output signal of the improved vehicle detector disclosed herein, reference is again made to the stabilizing and time-limiting circuit 70 (FIGS. 9 and 11). Its function as a stabilizing circuit which biases the magnetometer 20 so as to shift its steady state operating point to a stable position has been previously described in conjunction with FIG. 11. The function of the stabilizing circuit 70 is not limited only to improving the operation of the detector disclosed herein. Rather, it performs an additional major function, namely, that of controlling the maximum time period or duration of the output signal of the detector which is produced in response to a detected vehicle, irrespective of how long the vehicle is detected. In the absence of such a circuit, it is apparent from the foregoing description and especially from the description of FIG. 12 that once a vehicle is detected at time $t_1$ (FIG. 12) by the magnetometer which produces an output signal whose amplitude is above the first threshold level $E_{t1}$, the output signal will continue until the amplitude of the output signal of the magnetometer falls below the second lower threshold level $E_{t2}$ at time $t_n$. If vehicles continuously pass over the detector without stalling or stopping thereon, the time period between the points $t_1$ and $t_n$ may be relatively short, not exceeding a few fractions of a second. However, if a vehicle, which is once detected and causes the magnetometer to produce an output signal which exceeds the first threshold level, stops or stalls on or nearby the detector, it is apparent that the output signal of the detector will continue so long as the vehicle is present, that is, until the vehicle finally passes on so that the output signal of the magnetometer falls below the second threshold level. To eliminate such an undesirable phenomenon, the stabilizing circuit 70 also operates as a time limiting circuit to control the maximum duration of the output signal of the detector.

Briefly stated, in the apparent steady state of operation, the stabilizing circuit 70 controls the output signal of the magnetometer to be equal to $E_m$ which is substantially equal to the reference voltage $E_r$. This is accomplished by comparing the two signals and supplying additional biasing current to the magnetometer whenever the output signal from the magnetometer exceeds $E_r$ for a substantial length of time. Whenever this happens, the potential at point Y (FIG. 11) is increased by the differential amplifier 71, so that the capacitor 76 is charged to a higher potential, thereby increasing the biasing current supplied by the emitter follower 75. The potential to which the point Y is raised is a function of the amount by which the output signal of the magnetometer 20 exceeds the reference voltage $E_r$. The rate at which the capacitor 76 is charged up is a function of the time constant determined by the resistor 73 and the capacitor 76. Whenever the output signal from the magnetometer 20 rises above its ambient level $E_m$, due to a detected vehicle, the stabilizing circuit 70 will start biasing the magnetometer to reduce the increase in its output signal. However, if the vehicle moves continuously without stalling or stopping, it generally passes over the magnetometer in a time period which is considerably shorter than the time constant hereinbefore referred to. Thus, the capacitor 76 is not charged to such an additional level as to produce sufficient biasing current (through the emitter follower 75) to affect the output signal produced by the magnetometer in response to the detected vehicle.

However, if a vehicle, after being detected, does stall or stop over the detector for a period substantially comparable to or longer than the charging time constant of the capacitor 76, the stabilizing circuit 70 will cause the production of sufficient biasing current to bias the magnetometer 20 so that the amplitude of its output signal gradually decreases until it again substantially equals $E_m$ and $E_r$. As the amplitude of the output signal of the magnetometer decreases, the amplitude at some time (as a function of the time constant) drops below the second lower threshold level so that the output signal of the detector ceases, even though a stalled or stopped vehicle is still detected. For example, assume that a vehicle is detected by the magnetometer 20, which at a time $t_0$ (FIG. 12) starts producing an output signal having a waveform 85. At time $t_1$, the output signal of the magnetometer will exceed the first threshold level $E_{t1}$ so that an output signal is produced by the vehicle detector. Further assume that at a time $t_s$, before time $t_n$, the vehicle stalls for an indefinite time over the magnetometer 20. As seen from FIG. 12, the vehicle will cause the magnetometer to produce an output signal whose amplitude level is designated $E_s$. Since the level $E_s$ is greater than the level $E_m$ and the reference voltage $E_r$, the differential amplifier 71 (FIG. 11) will cause the potential at point Y to rise. The increase in potential at that point will cause the capacitor 76 to charge toward this higher potential. This will raise the potential at the input to the emitter follower 75 and, as a consequence, increase the biasing current supplied therefrom to the magnetometer 20. As the biasing current increases, the amplitude of the output signal of the magnetometer decreases, so that in some limited time period the amplitude will drop below the second threshold level $E_{t2}$, thereby terminating the output signal from the difference amplifier 40. Eventually, the biasing current will sufficiently increase to bias the magnetometer so that its output signal is again equal to $E_m$. This will happen even though in the absence of such biasing current the detected vehicle would have caused the magnetometer 20 to produce an output signal of amplitude equal to $E_s$ (FIG. 12). However, as soon as the stalled vehicle starts moving again and its effect on the magnetometer is eliminated at time $t_x$, the output signal from the now highly-biased magnetometer will be smaller than the reference signal $E_r$. This causes the potential at point Y to drop virtually to ground potential, thereby forward biasing the diode 74. Such forward biasing of the diode provides a relatively low resistance path through which the charged capacitor 76 quickly discharges. The fact that the capacitor 76 is quickly discharged enables the system to return in a short time period to its apparent steady state operating point so as to be in condition to detect a succeeding vehicle.

From the foregoing description, it is apparent that the stabilizing and time limiting circuit 70, by sensing the output signal of the magnetometer 20 and producing a biasing current in order to maintain the amplitude thereof at a predetermined level, acts as a serving feedback system. Such an arrangement is most advantageous since it not only stabilizes the magnetometer, but also controls its output signal so that it cannot substantially exceed its predetermined level for any time period greater than one predetermined by the charging time constant of the capacitor 76. This time constant may be thought of as the biasing time constant of the stabilizing circuit 70. Such biasing time constant is generally controlled to be quite long with respect to the average time a moving vehicle affects the magnetic field intensity detected by the magnetometer, so that the detection of such a moving vehicle is not materially affected by the output signal time-limiting characteristics of the stabilizing circuit 70.

Figure 13:
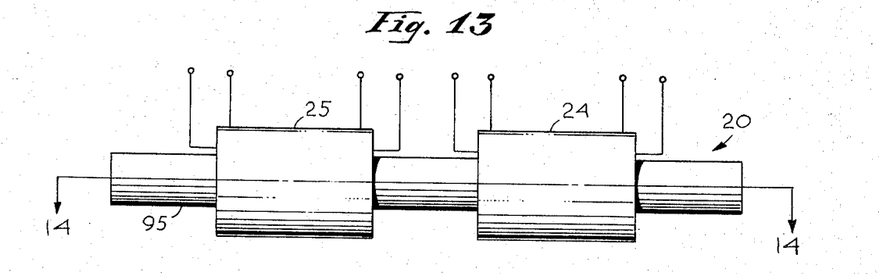
FIG. 13 is a side view of a flux gate magnetometer sensing element which may be employed as a magnetic field sensing device in accordance with the invention.
Figure 14:
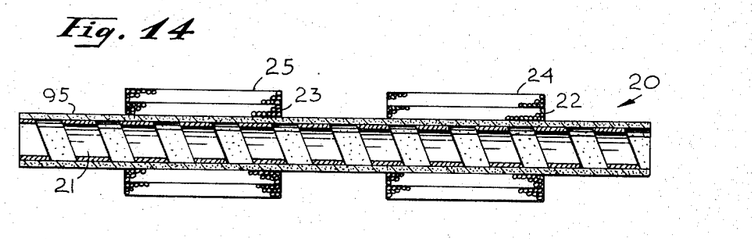
FIG. 14 is a sectional view taken along line 14—14 of FIG. 13.

By way of example only, one suitable type of magnetometer sensing element for use in accordance with the invention is illustrated in FIGS. 13 and 14. In FIGS. 13 and 14, a single magnetometer sensing element 20 is shown, which comprises a magnetically permeable strip 21 of a saturable material such as, for example, molybdenum permalloy alloy 4–79, having dimensions of the order of .001 inch by .062 inch. The strip is spirally wrapped inside a length of ceramic tubing 95 constructed of a material capable of withstanding temperatures of 2500° F. The strip may have, for example, an inside diameter of .04 inch and an outside diameter of .06 inch and be approximately 1.5 inches in length. The assembly may be hydrogen-annealed according to conventional methods for the particular strip material involved, and after annealing the ceramic tube may then be used directly in the assembly.

Wound about the ceramic tube 95 are the energizing coils 22 and 23, and wound on top of the energizing coils are the output windings 24 and 25. Each of the energizing coils may consist of two double layer coils of No. 38 wire, ¼ inch long, with 104 turns for each winding, spaced 9/16 inch apart. As noted previously, the energizing coils 22 and 23 are reverse connected so as to produce an opposite magnetization effect upon the saturable strip 21. After the coils are assembled on the support tube 85, the ends of the tubing may be capped with a suitable sealer to render the over-all structure impervious to moisture. The resultant structure will withstand thermal and physical shocks without damaging the magnetic properties of the saturable strip. The coils 22, 23, 24 and 25 may be connected as shown in FIGS. 9 and 11, with the magnetometer being aligned along its axis with the earth's magnetic field lines as shown in FIG. 7 or FIG. 8.

With the described construction for the flux gate magnetometer, a suitable energization frequency, which may be provided by the oscillator 26 of FIG. 9, is 65 kilocycles.

Figure 15:
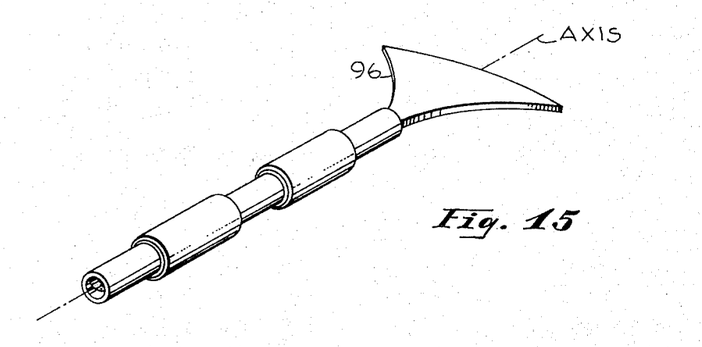
FIG. 15 is a side view of an alternative arrangement of a flux gate magnetometer sensing element including magnetically permeable elements for defining a predetermined flux collecting aperture.

FIG. 15 shows an alternative arrangement of a magnetometer sensing element for use in accordance with the present invention, in which a magnetically permeable element 96 is magnetically coupled to the saturable strip 21. The magnetically permeable element 96 functions to gather and collect magnetic fields in an adjacent area. By a suitable selection of one or more auxiliary magnetically permeable elements to be used in conjunction with a magnetometer sensing unit in accordance with the invention, a particular flux collecting aperture of a desired size and shape may be established. As noted previously, in accordance with the practice of the invention, the magnetometer may be positioned so that the flux collecting aperture provides an area on a plane transverse to the earth's ambient magnetic field within which the average flux density at a given distance from a vehicle path does not fall below the ambient value. By using auxiliary magnetically permeable flux collecting elements, as shown in FIG. 15, the effective flux collecting aperture of the magnetometer sensing element may be enlarged so that the corresponding area on a given plane transverse to the earth's ambient field is enlarged. The result is that the magnetometer sensing element may be placed somewhat closer to the vehicle path than would otherwise be possible, yet maintaining the relationship which enables the present invention to provide signals representing passing automotive vehicles. As may be expected, through the use of magnetic flux collecting elements and by a closer positioning of the magnetometer relative to the vehicle path, an increased output signal may be obtained. Moreover, the shape of the flux collecting aperture may be selected in accordance with the invention to be greater in dimension in the direction of travel along a roadway. This enhances the averaging of the flux density in the desired direction while minimizing the effects produced by vehicles passing in adjacent lanes. The particular arrangement of FIG. 15 is suitable for this purpose when the element 96 is properly oriented along the direction of vehicle travel. It should be noted that where the magnetic field sensing element is suspended above the roadway a greater distance between the vehicle path and the sensing element may be desirable than where the magnetic sensing element is placed below the surface of the ground. Therefore, in overhead installations, auxiliary magnetic field collecting elements may be employed to control the flux collecting aperture as desired.

Figure 16:
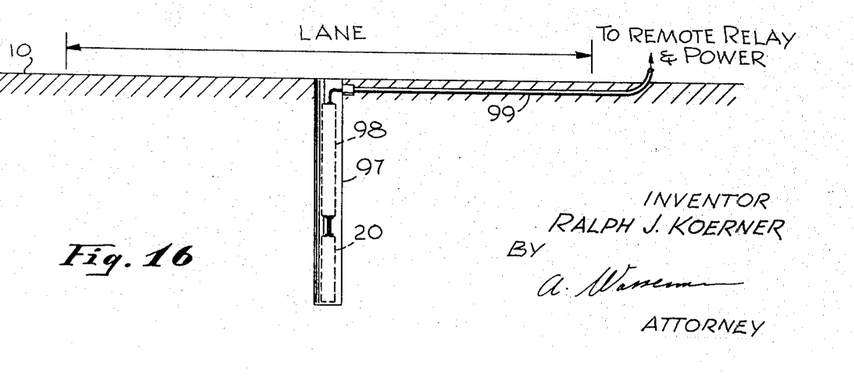
FIG. 16 is a diagrammatic illustration showing another way of positioning the apparatus of the present invention in the path of a passing vehicle.

Another way of practicing the invention is represented in FIG. 16 wherein a container 97, housing the magnetic field sensing element 20 and all of its associated circuitry previously described (except for the relay 90 and the indicator means) is shown positioned beneath the earth's surface 10. The circuitry is indicated generally by the numeral 98. The container is preferably fabricated of nonferrous material, such as aluminum or plastic, and has a cylindrical shape. The cylindrical container is positioned with its axis perpendicular to the path of vehicular traffic, and the circular top of the container is located just below the earth's surface. Experiments indicate that a cylindrical housing 20 inches in length and 1 inch in diameter is sufficient in size to house all necessary components. It is preferable to mount the magnetic field sensing element 20 at the bottom of the container, as shown in FIG. 16, with its axis parallel to the container axis. Thus, the distance of the magnetometer element from the earth's surface is conveniently controlled and made uniform for all installations. Further, all components which are temperature sensitive are preferably mounted at the bottom of the container in order to more evenly maintain their temperature environment. The container 97, which is hermetically sealed to prevent moisture from entering the interior, is furnished with a multi-lead cable 99 which connects the circuitry 98 within the container to the relay 90 and indicator means, which may be located as desired. The leads in the cable 99 also serve as power leads for supplying the circuitry with the required D.C. operating potential from a remotely located power source, and as test leads to enable remote monitoring of the electronic performance of the circuit.

Summarizing briefly, the improved vehicle detector of the present invention incorporates magnetic field sensing means such as a flux gate magnetometer, which is positioned in a particular location to sense or detect the average flux density within a given area on a predetermined plane transverse to the earth's ambient magnetic lines of force. The magnetometer senses the appearance or presence of a vehicle which produces perturbations in the earth's magnetic field by sensing the changes in the average flux density within the given area. The magnetometer produces an output signal whose amplitude is directly related to the detected changes in the average flux density caused by the vehicle. Effects of variations in the output signal of the magnetometer due to reasons other than changes in the detected average flux density, such as variations in the operating conditions of the magnetometer's energizing means are substantially eliminated by a stabilizing and time-limiting circuit. This circuit, which acts as a servo feedback system, controls the amplitude of the steady state output signal of the magnetometer irrespective of extraneous variations. The stabilizing and time limiting circuit also controls the maximum duration that the magnetometer's output signal may exceed its predetermined steady state amplitude, thereby controlling the maximum duration that the improved vehicle detector may produce a usable output signal irrespective of how long a vehicle may be sensed by the magnetometer.

A first threshold level may be established so that perturbations in the earth's magnetic field have to exceed a predetermined value before a usable output signal from the detector of the present invention is initiated. A second threshold level, lower than the first threshold level but above the ambient operating level, may be established so that once a usable output signal is initiated, it continues until the perturbations of the earth's magnetic field fall below a predetermined second value. Both threshold levels are proportionately set from a constant D.C. source, which also sets the ambient operating point or reference point of the improved vehicle detector disclosed herein.

Although there has been described a specific arrangement of an improved vehicle detector in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered to be a part of the invention.

The embodiments of the invention in which an exclusive property or privilege is claimed are defined as follows:

1. A system for detecting vehicles comprising:
    sensing means having an output winding providing an output signal whose amplitude is substantially proportional to magnetic field intensity through a defined sampling area;
    means for supporting said sensing means for locating said sampling area adjacent to a path on which vehicles are to be detected;
    demodulator means providing a direct voltage signal in response to said output signal;
    a source providing a reference signal of predetermined amplitude;
    difference means responsive to an amplitude difference between said reference and direct voltage signals for providing a negative feedback signal;
    capacitive delay means coupling said feedback signal to said output winding for controlling said output signal after a predetermined time interval;
    utilization means; and
    control means responsive to said direct voltage signal for energizing said utilization means.

2. The system of claim 1 wherein said control means includes means for establishing a first threshold level at which said control means energizes said utilization means.

3. The system of claim 2 wherein said control means includes means for establishing a second threshold level at which said control means deenergizes said energized utilization means.

4. The system of claim 1 wherein said sensing means includes a saturable core having said output winding coupled thereto.

5. The system of claim 4 wherein said sensing means is supported at a predetermined distance from said path at which a vehicle to be detected passing in a single direction along said path produces successive variations in the earth's magnetic field intensity, only the first and last intensity variations falling below the ambient intensity through said sampling area in the absence of a vehicle.

6. The system of claim 1 wherein said delay means includes a resistor coupling said feedback signal to said output winding and a capacitor connected to said coupling in a shunt; and
    diode means connected in shunt with said resistor.

References Cited

UNITED STATES PATENTS

| | | | |
|---|---|---|---|
| 2,570,870 | 10/1951 | Schmitt | 340—197 |
| 2,685,680 | 8/1954 | Williams | 340—38 |
| 3,237,155 | 2/1966 | Brockett | 340—38 |
| 3,249,915 | 5/1966 | Koerner | 340—38 |
| 2,917,732 | 12/1959 | Chase | 340—38 |
| 2,943,306 | 6/1960 | Gray | 340—38 |

THOMAS B. HABECKER, *Acting Primary Examiner.*

NEIL C. READ, *Examiner.*